United States Patent
Martin et al.

(10) Patent No.: US 7,209,042 B2
(45) Date of Patent: Apr. 24, 2007

(54) RFID TAG WITH VISUAL ENVIRONMENTAL CONDITION MONITOR

(75) Inventors: Jean-Paul Martin, London (GB); Frederick R. Grabiner, Livingston, NJ (US)

(73) Assignee: Temptime Corporation, Morris Plains, NJ (US)

( * ) Notice: Subject to any disclaimer, the term of this patent is extended or adjusted under 35 U.S.C. 154(b) by 146 days.

(21) Appl. No.: 11/017,534

(22) Filed: Dec. 20, 2004

(65) Prior Publication Data

US 2006/0145863 A1   Jul. 6, 2006

(51) Int. Cl.
*G08B 13/14* (2006.01)

(52) U.S. Cl. .............................. 340/572.8; 340/572.1; 340/691.6; 340/539.29; 250/482.1

(58) Field of Classification Search ............ 340/572.8, 340/3.1, 5.1, 572.1, 539.29, 545.5, 573.1, 340/691.1, 691.6, 568.1, 10.1; 250/482.1, 250/385; 435/12, 15, 18; 503/201, 226

See application file for complete search history.

(56) References Cited

U.S. PATENT DOCUMENTS

| | | |
|---|---|---|
| 4,189,399 A | 2/1980 | Patel |
| 4,384,980 A | 5/1983 | Patel |
| 4,646,066 A | 2/1987 | Baughman et al. |
| 4,735,745 A | 4/1988 | Preziosi et al. |
| 4,737,463 A | 4/1988 | Bhattacharjee et al. |
| 4,788,151 A | 11/1988 | Preziosi et al. |
| 4,789,637 A | 12/1988 | Preziosi et al. |
| 4,812,053 A | 3/1989 | Bhattacharjee |
| 4,892,677 A | 1/1990 | Preziosi et al. |
| 4,917,503 A | 4/1990 | Bhattacharjee |
| 5,057,434 A | 10/1991 | Prusik et al. |

(Continued)

FOREIGN PATENT DOCUMENTS

| | | |
|---|---|---|
| WO | WO2004077002 A1 | 9/2004 |
| WO | WO2006048412 A1 | 5/2006 |

OTHER PUBLICATIONS

U.S. Appl. No. 10/457,664, filed Jun. 10, 2003, Prusik et al.
U.S. Appl. No. 60/625,563, filed May 11, 2006, Haarer et al.
International Search Report of PCT/US05/45945, mailed on Sep. 17, 2006.

*Primary Examiner*—Anh V. La
(74) *Attorney, Agent, or Firm*—Kirpatrick & Lockhart Nicholson Graham LLP

(57) ABSTRACT

A combination RFID tag intended to be associated with a host product, for example by being secured to the outside of a package containing a perishable product, e.g. foodstuffs or vaccines, which RFID tag is provided with a visually readable environmental condition exposure indicator. The visual indicator can sense the exposure of the RFID tag to an environmental condition e.g. temperature, experienced by the host product providing a visual indication, e.g. a color change, readable externally of the RFID tag of the sensed environmental condition. The visual indicator can be chemically active, for example an acetylenic agent, and may be responsive to cumulative temperature excursions over time. The novel RFID tag 11 and tag inspection methods of the invention permit an efficacious harnessing of information about the condition exposure history of a specific inventory item including product identification and related data. The information from multiple items can be compiled into a database that may be audited or statistically analyzed to reveal useful information regarding the handling of the items.

29 Claims, 2 Drawing Sheets

U.S. PATENT DOCUMENTS

| | | | |
|---|---|---|---|
| 5,709,472 A | 1/1998 | Prusik et al. | |
| 5,936,523 A * | 8/1999 | West | 340/545.6 |
| 6,042,264 A | 3/2000 | Prusik et al. | |
| 6,271,753 B1 * | 8/2001 | Shukla | 340/545.6 |
| 6,294,997 B1 | 9/2001 | Paratore et al. | |
| 6,294,999 B1 * | 9/2001 | Yarin et al. | 340/573.1 |
| 6,346,886 B1 * | 2/2002 | De La Huerga | 340/573.1 |
| 6,544,925 B1 | 4/2003 | Prusik et al. | |
| 6,577,238 B1 * | 6/2003 | Whitesmith et al. | 340/572.1 |
| 6,642,016 B1 | 11/2003 | Sjoholm et al. | |
| 6,667,092 B1 | 12/2003 | Brollier et al. | |

\* cited by examiner

RFID TAG WITH VISUAL ENVIRONMENTAL CONDITION MONITOR

STATEMENT REGARDING FEDERALLY SPONSORED RESEARCH OR DEVELOPMENT (Not applicable.)

BACKGROUND OF THE INVENTION

The present invention relates to radio frequency identification ("RFID" herein) tags, and more particularly, to an RFID tag provided with means to detect and externally report information regarding an environmental condition.

Many different devices are known for marking, labeling, tagging or otherwise associating information with a host product regarding matters such as the identity, source, nature, price and/or other characteristic of the product. Such information is useful to inform consumers, end users, distributors, manufacturers and others who may handle, inspect or merely encounter commercial and other products distributed in a modern society.

Such known devices include printed text or graphic labels and tags of paper, card, plastic or metal which may be attached to a host product by various means such as adhesive, stitching, ties, rivets, or other fastening means, as well as electronically readable information such as magnetic or optical codes such as bar codes and the like. Another category of such information device the use of which is growing rapidly at the time of making the present invention comprises radio frequency identification devices, commonly referenced by their initials as "RFIDs".

RFIDs are of particular interest for the ease with which they can be read, their low cost, the quantity of information that can be communicated, and the fact that this information is usually available in a digital form convenient for downstream data processing. In late 2004 they are being widely adopted in the United States with major organizations such as Wal-Mart and the US Department of Defense expected to require use of RFIDs by their vendors in the very near future. With such markets in view, the present invention contemplates and provides an innovative RFID device with novel useful capabilities.

In addition to the above-described identity and other information, it can often be useful to associate with a product historical information about an environmental condition, e.g. temperature fluctuations, to which the product has been exposed as such information may be relevant to the quality of the product during transport and storage and as well as to the product's quality when it reaches the consumer or other end user. Desirably, such information should be easily communicated and received externally of the host product. Various means are known for monitoring environmental conditions that are suitable for incorporation in information labels or tags associated with host products and which can communicate the environmental information externally of the host product. Such means include chemical sensors that report information visually and biochemical sensors that communicate electronically.

Sjoholm, et al. in U.S. Pat. No. 6,642,016 assigned to Bioett AB, describe one such information device, intended for incorporation with a product label to indicate the status of an associated product, which reportedly can sense and report environmental data as well as product identifying data. Sjoholm, et al. disclose a biosensor useful to indicate the status of a product which employs a sensor unit that employs an enzyme to contact a substrate in a manner changing the substrate's conductivity as a function of time and temperature. The sensor unit is included as a component in an electric circuit. According to Sjoholm, the electric circuit can be remotely activated by applying an electric field and/or a magnetic field over the electric circuit to generate a measurable resistance-indicating signal related to the substrate conductivity. The biosensor can be incorporated in a label to indicate the status of a host product. Biosensor signals together with product ID can be stored in a memory unit (column 8, lines 48–51) at a control station.

Sjoholm et al.'s proposed device is complex requiring a number of electrical components, and lacks provision on the device for product ID information. Furthermore, Sjoholm et al.'s lacks convenient indication of the probable condition of a host product and of how that condition relates to a freshness threshold of the product.

Thus, known environment-condition reading devices intended for tags or labels fail to provide the benefits of RFIDs, may be unduly costly, or complex and may have other drawbacks.

As is known in the art, for example from Paratore et al. U.S. Pat. No. 6,294,997, RFID devices or tags are small, low-cost wireless transponder devices equipped with non-volatile memory for information storage, typically information about an item or host product to which the RFID tag is attached. For example, inventory items can carry RFID tags providing information such as serial numbers, price, weight, and size. RFID tags are capable of responding to wireless interrogation by wireless transmission of stored information for receipt by the interrogator. The term "RFID tag" is used herein to include self-supporting, self-contained tags, cards or labels that are attachable to a host product or product, continuous web tags separable into individual tags for attachment to a host product, RFIDs supported on a substrate or otherwise constructed for incorporation on or into a host product and any other RFID device suitable for association with a host product to transmit information regarding the host product externally of the product.

Use of RFID tags can permit efficient retrieval of information regarding an item at various points in the manufacturing and distribution chain, and can also permit tracking of the individual item. Some RFID tags permit relatively large amounts of data to be associated with the product. An RFID tag typically includes a memory, an RF transmitter, an RF receiver, an antenna, and logic for controlling the various components of the memory device. The antenna may be formed on a flexible substrate, while analog RF circuits and digital logic and memory circuits are embodied in an integrated circuit ("IC") carried by the substrate and coupled to the antenna. RFID tags may also include a number of discrete electronic components, such as capacitors, transistors, and diodes.

RFID tags can be either passive or active devices. Active devices are self powered, typically by a battery. Passive devices lack their own power source and derive energy from the RF signal used to interrogate the RFID tag. Passive RFID tags usually include an analog circuit, which detects and decodes the interrogating RF signal and which provides power from the RF field to a digital circuit in the tag. The digital circuit generally executes all of the functions performed by the RFID tag, such as retrieving stored data from memory and modulating the RF signal to transmit the retrieved data. In addition to retrieving and transmitting data previously stored in the memory, the RFID tag can permit new or additional information to be stored into the RFID tag's memory, or can permit the RF tag to manipulate data or perform some additional functions.

The ubiquity of RFID tags and their convenience as low cost remote information reporters that can be economically employed to useful effect to provide information about a wide range of commercial and other products, has led to numerous proposals to exploit their low-cost communications capabilities to enable remote reporting of a variety of data regarding a host product. These proposals include RFID devices and systems for collecting and communicating environmental condition information.

For example, Brollier U.S. Pat. No. 6,667,092 discloses an RFID processor embedded in a corrugated structure between a linerboard and a corrugated medium. One or more sensors for ambient environmental conditions such as time, temperature, pressure, and humidity may be electrically coupled to the RF processor. The sensors may be utilized to read and transmit a signal corresponding to the environmental or other conditions when signaled by an RF reader.

Paratore et al. (supra) also discloses the use of sensors to monitor various conditions ambient to the host product. Paratore et al.'s RFID tag comprises a number of auxiliary electronic modules providing data regarding changes in various physical parameters which data can be supplied to the RFID tag memory and be reported externally in response to interrogation of the RFID tag. The auxiliary modules include a timing module 20 which employs a capacitor 21 ($C_3$), a resistor 22 ($R_3$), an A/D converter 24, a control circuit 26, and an N-bit register 28 to generate timing ticks. Environment module 70 tracks resistance values and their changes with temperature or employs a microsensor to evaluate an environmental condition that exceeds a certain threshold. Another embodiment of environment module 70 employs evaporation of a polymer to create a conductive circuit whose conductivity can be measured (by unspecified means) to determine temperature elevation. With 11 the assistance of timing module 20, reportedly, the duration that an environmental condition is elevated, as determined by environment module 70, can be determined. The information generated by environmental module 70, is converted to an appropriate number of timing ticks by timing module 20 and stored as digital data in memory 60 to be reported externally of the tag in response to interrogation. Paratore et al.'s device is proposed for use for monitoring the temperature or other conditions to which a perishable or degradable good, such as a foodstuff, may be exposed over time.

While it can be useful to detect and report an environmental parameter from an RFID tag, devices such as Paratore et al.'s and Brollier's are complex, expensive and potentially cumbersome, and accordingly are unsuitable for certain applications. Pursuant to the invention, it has been understood that it would be desirable to provide an RFID tag which is capable of simply and economically monitoring an environmental condition.

The foregoing description of background art may include insights, discoveries, understandings or disclosures, or associations together of disclosures, that were not known to the relevant art prior to the present invention but which were provided by the invention. Some such contributions of the invention may have been specifically pointed out herein, whereas other such contributions of the invention will be apparent from their context. Merely because a document may have been cited here, no admission is made that the field of the document, which may be quite different from that of the invention, is analogous to the field or fields of the present invention.

BRIEF SUMMARY OF THE INVENTION

It is one object of the invention to provide an RFID tag having a simple, economic means for detecting and reporting an environmental condition.

Another object of the invention is to provide such a tag which is useful for monitoring the condition of a perishable product while being able to externally report the identity of the product in response to RF interrogation.

Accordingly, the present invention provides, in one aspect, an RFID tag intended to be associated with a host product, the RFID tag comprising:

a) a data memory to receive data regarding the host product;

b) a transponder to transmit data in the data memory to an external interrogator in response to interrogation; and c) a nonelectric environmental monitor comprising a visually readable indicator, the environmental monitor being capable of detecting an environmental condition experienced by the host product and of providing a visual indication readable externally of the RFID tag of the monitored environmental condition.

The visual indicator can be attached to the RFID, and the RFID may be attached to or supported by the host product. Desirably, the RFID is so disposed on the host product as to facilitate placement of the visual indicator in line-of-sight view with a visual inspector.

The environmental monitor can monitor conditions to which the host product, for example, a foodstuff, a vaccine or a medication, has been exposed. These conditions may include the elapse of a predetermined integral of deleterious ambient conditions which can correlate with the shelf life of such a product especially an integral of temperature over time. Such time-temperature indicators are referenced "TTI" herein. The indicator may comprise a distinctively marked visible area on the RFID tag.

If desired the elapse of a predetermined parameter such as a time-temperature integral, can be indicated by a change in color or other visual characteristic of the indicator. As is known in the TTI art such changes may be indicated by active agents such as acetylenic compounds which yield a color change upon polymerization, the polymerization being reliably related to time-temperature exposure. If desired, the TTI may be carried on a label attachable to the RFID.

The indicator area may comprise a reflective chemical colorant that changes its visual appearance, for example its color or color saturation in response to exposure to an environmental condition of interest, e.g. temperature, desirably in a manner which is cumulative over time. For example, the indicator may change from light blue to a relatively dark blue in a predictable manner after a predetermined exposure.

Where ultraviolet light may interfere with monitoring of a desired environmental condition, for example, when monitoring temperature with an RFID tag exposed to sunlight or fluorescent light, ultraviolet protection may be employed. Such protection can comprise a colored or colorless overlay. As is known for chemically based TTI's, a transparent orange or red, ultraviolet protective overlay may be employed whereby a blue TTI area has an approximately gray appearance verging on black when fully exposed. Alternatively, as is disclosed in Prusik et al. U.S. patent application Ser. No. 10/457,664 filed Jun. 10, 2003, attorney docket number LL 00301, the disclosure of which is hereby incorporated herein by this reference thereto, a transparent overlay may be employed, the overlay comprising one or more organic or inorganic ultraviolet-absorbing agents used alone or in combination.

If desired, a reference or comparator area or areas may be provided adjacent the indicator area to facilitate reading of the visual indication. The comparator and indicator areas can be selected and designed to have similar appearances after a cumulative temperature exposure estimated to be such as to bring the host product near to the end of its useful life, or to terminate its freshness.

The color change or other visual change of the indicator may be observed by a visual inspector which may be the human eye or an instrument such, for example as a calorimeter, reflection densitometer, an optical scanner such as a laser wand or an imaging device.

In one useful embodiment of the invention a densitometer, colorimeter, laser-based or other suitable optical scanner or indicator-reading device can be cooperatively associated with a suitable RFID interrogation device, for example by being spatially adjacent thereto, to obtain both a reading of the indicator and data regarding the host product, for example inventory information such as product code and serial number in one pass at a single visual inspection and RF interrogation station. Usefully, the visual inspection data may comprise a binary pass/fail shelf life or other condition reading. These valuable readings and related product data can be obtained with simple low-cost components without need for complex electrical or electronic circuits or components for timing and sensing and without requiring the monitored information to be supplied into data memory on the RFID tag. Furthermore, the novel RFID tag of the invention can provide a useful environmental condition indication which is easily read either by machine or the human eye.

If desired separate output signals from the visual inspector and the RF interrogation station can be fed to a single computer, or other data processor, which integrates the information outputting, or otherwise making available coherent data as to the condition of a specific, uniquely identified product. In most cases, juxtaposition of the RFID tag in suitable relationship with a visual inspector for reading of the indicator will place the RFID within good signal range of the RF interrogator. However, if necessary the transmission power of the interrogator or other parameter may be adjusted or selected to ensure that effective RF communication is obtained when the novel RFID tag is in range of the visual inspector.

The invention may usefully be employed with a variety of perishable host products some of which are further described herein and others of which will be apparent to those skilled in the art.

BRIEF DESCRIPTION OF THE SEVERAL VIEWS OF THE DRAWING

Some embodiments of the invention, and of making and using the invention, as well as the best mode contemplated of carrying out the invention, are described in detail below, by way of example, with reference to the accompanying drawings, in which like reference characters designate like elements throughout the several views, and in which.

DETAILED DESCRIPTION OF THE INVENTION

The following more detailed description of the invention is intended to be read in the light of, and in context with, the preceding summary and background descriptions but without being limited by the preceding descriptions.

Figure 1:
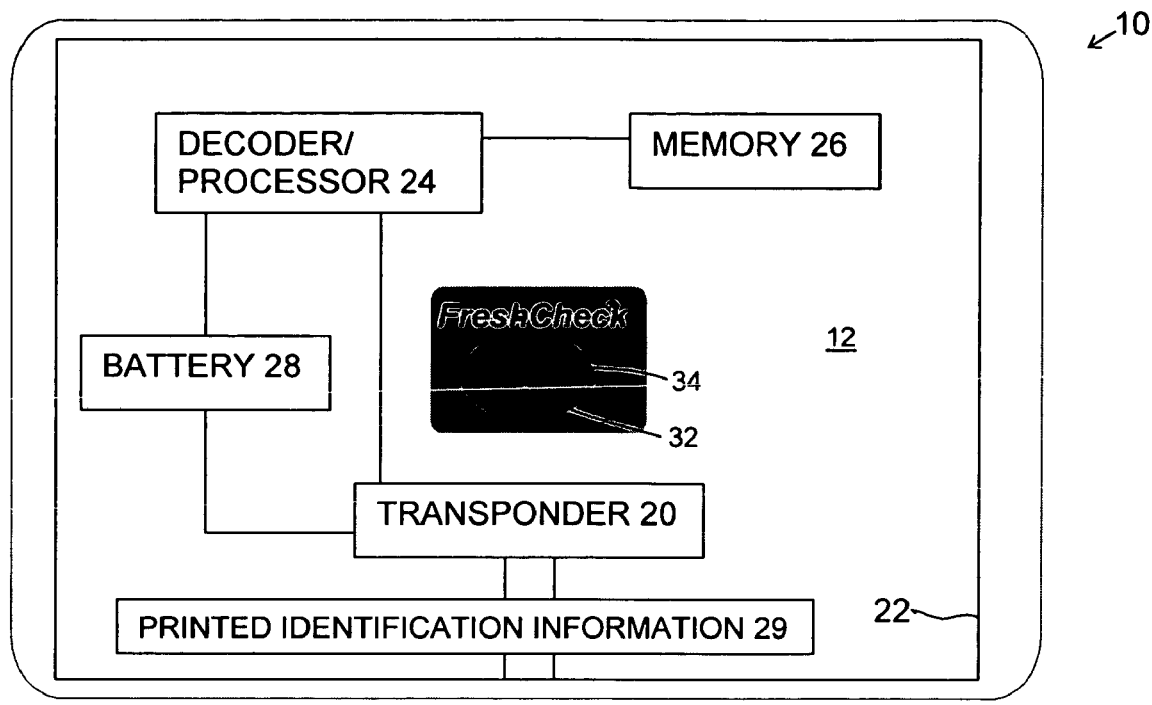
FIG. 1 is a schematic plan view of an embodiment of a combination RFID tag equipped with an optically readable condition sensor according to the invention.
Figure 2:
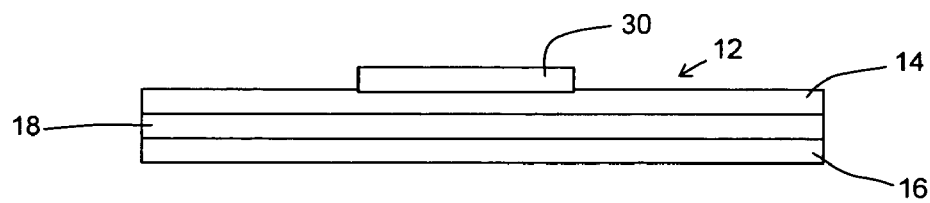
FIG. 2 is a lefthand side elevation view of the condition-sensing RFID tag shown in FIG. 1.

Referring to FIG. 1, one exemplary embodiment of condition-sensing RFID tag 10 useful in the practice of the present invention comprises a rectangular laminate label 12 of plastic, card or other suitable material. Label 12 comprises protective upper and lower plastic sheet layers 14 and 16 respectively which sandwich a printed circuit 18 providing RFID functionality in an intermediate layer.

Printed circuit 18 comprises an analog transponder 20, to detect and decode an RF interrogation signal, an antenna 22 to receive and transmit the signal and a decoder-processor 24 to execute the RFID functions and provide analog-digital conversion for communication with transponder 20. Printed circuit 18 further comprises memory 26 to store data which can be accessed by decoder-processor 24. Decoder-processor 24 may comprise an integrated circuit chip, a microprocessor (neither one shown) or suitable functionality providing limited intelligence, or a control capability, to manage and execute the RFID functions, at low cost. Other details of printed circuit 18 will be apparent to or understood by those skilled in the art. RFIDs 10 can be supplied in volume by techniques such as printing in one or more layers on flexible stock, which can be continuous web stock for larger volumes.

Optionally, printed circuit 18 can also include a battery 28, which may for example be a thin-film battery such as is supplied by KSW-Microtec, Dresden, Germany to provide power. Alternatively, the RFID may be of the passive type, which employs antenna 22 to obtain power for the RFID circuitry from the RF interrogation field.

As is known in the art, printed circuit 18 can retrieve stored data from memory 26 and modulate the RF signal output by transponder 20 to transmit the retrieved data to the interrogator. In addition to retrieving and transmitting data previously stored in memory 26, RFID tag 10 can permit new or additional information to be stored in memory 26. Additional information stored in memory 26 can for example include information as to elapsed time, supplemental environmental exposure information, additional descriptive information regarding the host product or product item or other useful or desired information. If desired, supplemental data manipulation or other additional functionality, can be provided in printed circuit 18.

Optionally, RFID tag 10 may include printed identification, or other, information 29 or other human-readable indicia corresponding with the electronically stored information to enable a human or an optical reading machine to read the identification data for verification of an electronic read or to make the identification and/or other information available when an operational RF interrogator is unavailable.

Mounted on upper layer 14 of RFID tag 10 is a visually active environmental condition-sensing indicator 30, which may for example provide a visual indication of exposure of RFID tag 10 to temperature fluctuations. One embodiment of indicator 30 provides an indication of elevated temperature exposure which is cumulative with time. Another embodiment provides a cumulative indication with time of temperature fluctuations above or below a threshold temperature, e.g. excursions below freezing. Alternatively, or in addition, condition-sensing indicator 30 can sense radiation of any kind including ultraviolet radiation, X-ray and shorter radiation or humidity.

The particular condition-sensing indicator 30 shown comprises a central; visually readable indicator zone 32 which provides a visual response to environmental exposure to one or more conditions. A peripheral reference zone 34 is contiguous with and extends around indicator zone 32 and is suitably pigmented to facilitate judgment or determination of the significance of the appearance of central indicator zone 32. Multiple reference zones 34, in various configurations and with different visual characteristics can be provided, if desired.

Indicator zone 32 of condition-sensing visual indicator 30 may employ, incorporated in an ink or in other useful manner, a suitable chemical active agent, for example a polyacetylenic active agent which provides a visual response to environmental exposure to temperature, moisture, or other targeted environmental condition. Some useful polyacetylenic active agents include substituted diacetylenic agents such, for example, as: 2,4-hexadiyn-1,6-bis (ethylurea), also known as "KE monomer"; 2,4-hexadiyn-1,6-bis (propylurea) also known as "KPr monomer"; and co-crystallized acetylenic agents, such as a 2:1 co-crystallized mixture of the KE and KPr monomers, which mixture is also known as "KX monomer".

Other polyacetylenic agents may be employed as is known, for example, from Patel U.S. Pat. Nos. 4,189,399 and 4,384,980 and Preziosi et al. U.S. Pat. Nos. 4,789,637 and 4,788,151. The disclosure of each one of the aforementioned Patel and Preziosi patents is hereby incorporated herein by this specific reference thereto. Those skilled in the art will understand modifications that may be made to such agents including broad ranges of substituents that may be made and complexes in which they may be incorporated, as well as methods of synthesis and blending and co-crystallization operations that may be employed to provide visually active condition-sensing agents useful in the practice of the present invention.

As is known in the art, visual indicator 30 may, with advantage, be an indicator such as is supplied, by TEMPTIME Corporation, Morris Plains, N.J. For example, visual indicator 30 may be a time-temperature indicator which provides a color change after a given degree day or degree hour exposure of the indicator and may provide a cumulative indication of temperature fluctuations over time. Such indicators can reliably measure the integral over time of a variable temperature profile. Thus, in one nonlimiting example, a visual response time-temperature indicator is selected for use with a vaccine and has characteristics such that an exposure to an average temperature of 37° C. for a 14-day period will signal the end of the effective lifetime of the vaccine. Such endpoint indication may also be provided by other exposures, for example, a 10-day period in which a nominal exposure at 25° C. is interrupted by occasional excursions to 45° C. A desired endpoint may be indicated by the visual appearance of reference zone 34 whereby when indicator zone 32 matches reference zone 34, the end of lifetime is reached. The endpoint indication can be selected as desired and may, for example, provide an indication of shelf-life expiry or impending loss of freshness or other suitable end point.

A given visual indicator may employ a chemically active agent selected to have suitable time-temperature response characteristics to provide a useful, clearly visible color change in response to a desired cumulative temperature exposure for a particular host product. If desired, the activity of the chemically active agent may be adjusted, by selection of the agent, to compensate for the differential between the temperature histories of an RFID tag 10 disposed on the outside of a container, package or the like and a host product within which may be temperature insulated by the packaging.

Usefully, an ultraviolet protective layer 36 can be provided overlying indicator zone 30 of RFID tag 10 to protect it from undesirably responding to ultraviolet light exposure from daylight or fluorescent lighting. Ultraviolet protective layer 36 may be dyed to filter out shorter wavelengths, being colored orange, red or another suitable color. Alternatively, ultraviolet protective layer may be transparent and comprise an organic or inorganic antiactinics agent, for example micronized zinc oxide. One useful embodiment of such a UV-protective overlay is described and claimed in the above-cited Prusik et al. U.S. application Ser. No. 10/457, 664.

The characteristics of the active agent or agents employed in visual indicator 30 may be selected according to known or estimated characteristics of the host product to provide a visual change at a point in time indicative of a change or imminent change in the host product, for example loss of freshness. In general, a wide range of active agent performance characteristics is available by suitable choice and manipulation of the active agent, as is known to those skilled in the art. Performance characteristics capable of indicating cumulative environmental temperature fluctuations over time periods of from a few days to several years are available, for example, from the assignee of this application, TEMPTIME Corporation, Morris Plains, N.J. While the invention can employ any suitable active agent, and is not limited in this respect, active agents capable of monitoring environmental temperature fluctuations, e.g. temperature exposures in the range of from about 0° F. to 150° F. for a period in the range of from 2 days to 5 years.

In one useful embodiment of the invention, RFID tag 10 is disposed on a perishable host product, e.g. a crate of chicken, or other meat or fish, in a manner such that indicator 30 has the same exposure to the target environmental condition as does the host product, or a perishable component of the host product. The perishable host product could be any one of a wide range of products, for example foodstuffs, including fruit, vegetables dairy and baked products as well as meats, cut flowers, cosmetics, beauty aids, blood, blood products, diagnostic devices, drugs, medicaments, pharmaceuticals, medical devices, prophylactics and other products that will be apparent to those skilled in the art.

The response characteristics of indicator zone 32 are selected, for example by choosing one or more polyacetylenic agents with suitable time-temperature Arrhenius curves according to the perishability of the host product to provide a visual end point which is indicative of shelf-life expiry or impending loss of freshness of the perishable host product (or component). Such an embodiment of the invention may be useful on membrane packaging of perishable products such as meats or fish. However, in other cases, for example in a case where the RFID tag is employed as a label for a bulk package, such as a case or carton of fish, which may or may not be provided with cooling means, e.g. ice, within the case, the environmental exposure of the RFID tag may be quite different from that of the perishable products contained in the bulk package. In that case a material with a different curve may be employed that is more appropriate to the conditions experienced by the perishable host product.

Further embodiments of visual indicator 30 and materials that may be employed in the practice of this invention will be apparent to those skilled in the art in light of this disclosure, and may also be found in: Prusik et al. U.S. Pat. Nos. 6,544,925; 6,042,264; 5,709,472 and 5,057,434; Bhattacharee U.S. Pat. Nos. 4,917,503; 4,812,053; and 4,737, 463; as well as Preziosi, et al. U.S. Pat. Nos. 4,892,677 and 4,735,745; the entire disclosures of each one of which patents is hereby incorporated herein by this specific reference thereto. These patents provide additional useful teachings to the patents mentioned above.

Information supplied by the novel condition-sensing RFID tags 10 of the invention can be read in a variety of ways, providing great flexibility in their use. For example, in one embodiment of the invention, the ID and any associated information may be machine read by interrogation of the RFID at an inspection station and the visual condition indication may be optically read by machine at the same station. Such readings can provide electronic signals in an analog or digital format, as desired, which signals can be utilized locally at the inspection station or may be used at locations remote therefrom. The signals can be combined, e.g. into a single digital signal that provides product and/or item identification combined with condition-exposure information regarding the specific item identified, which condition-exposure information may, by utilizing reference zone 34, or its digital equivalent, include endpoint information about the freshness of the item.

Furthermore, information from multiple RFIDs 10 may be compiled into useful statistical information which may, if desired by applied in a production line, or at an inspection station to modify the treatment of handling of specific host product items according to their condition exposure histories.

Figure 3:
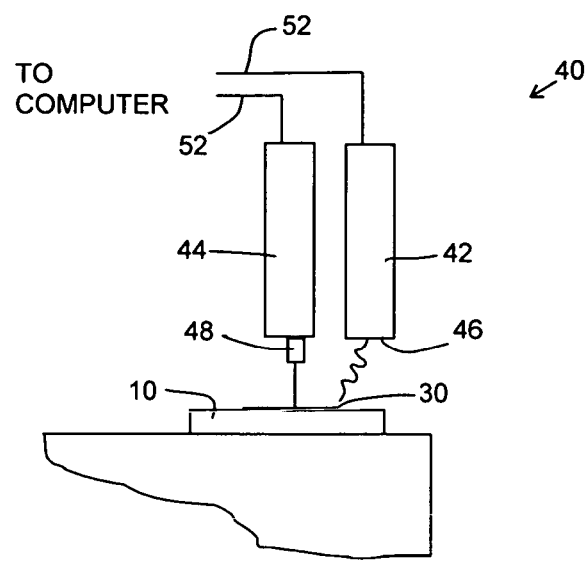
FIG. 3 is a schematic side elevation view of a duplex data inspection station where identification and condition exposure information can be machine read with the outputs being combined into a single signal, if desired.

Referring now to FIG. 3, the embodiment of data inspection station 40 there shown comprises an RF interrogator 42 disposed alongside an optical reader 44. RF interrogator 42 has a transceiver head 46 and optical reader 44 has a reading head 48. RF interrogator 42 can interrogate an RFID tag 10 and retrieve data from its memory 26 by outputting an RF interrogation signal compatible with RFID tag 10's circuitry which elicits a response from transponder 20. Optical reader 44 can read visual information from visual indicator 30 including condition exposure information using light supplied by reader 44 or ambient light.

Transceiver head 46 and reading head 48 are oriented distally with respect to inspection station 40 for effective communication with a package 50 bearing RFID tag 10 secured to an outer surface of package 50 and with visual indicator 30 disposed on the outer surface of RFID tag 10 for optimal visibility. If desired, visual indicator 30 could be displayed through a transparent window, RFID tag 10 being contained within package 50 or in a sleeve, envelope, insert or the like. Any suitable containment and mounting may be employed to associate RFID tag 10 with, or to secure it to, package 50 provided that visual indicator 30 is externally visible and RF communication with transponder 20 is not unduly impeded.

Package 50 is supported and oriented in the vicinity of data inspection station 40 and spaced at a suitable distance therefrom to permit effective reading of visual indicator 30 by optical inspection station 40 and effective interrogation of transponder 20 by RF interrogator 42. Reading of visual indicator 30 is effected by analysis of light received from the surface of visual indicator 30 which light can, if desired, be illumination originating from reading head 48 and can provide the information displayed by indicator zone 32 and reference zone 30 to optical reader 44.

The optical reading may comprise a simple reading of the visual characteristics of indicator zone 32, notably the optical density, hue and/or saturation or intensity of the hue or may comprise a comparative reading of the visual characteristics of indicator zone 32 and reference zone 34, in response to which optical reader 44 outputs a suitable signal, preferably in digital format. The output signal may include information as to the visual characteristics of indicator zone 32 alone, of indicator zone 32 and reference zone 34 or, desirably of the difference or differences between indicator zone 32 and reference zone 34. For example, the output visual information can include data indicating that indicator zone 32 is darker than reference 34, which data may be utilized to discriminate a particular package 50 from other packages 50 that lack such a comparative darkness indication, for example, by labeling the particular package 50, or diverting to a different destination from other such packages.

RF interrogator 42 can interrogate transponder 20 in known manner and obtain from transponder 20, information stored in memory 26 which is output from interrogator 42 as a suitable signal, desirably in digital format. This information desirably includes product identification information regarding a product or products contained in package 50, for example alphanumeric indicators of, model number, item number, serial number or quantity, or useful combinations of the foregoing numbers, and may also include supplemental information, if desired, such as is further described hereinbelow.

Signals output from RF interrogator 42 and optical reader 44 can be utilized in any desired manner and may, for example, be supplied to a local or remote computer or computerized device (not shown) via connectors 52. If desired the optical and RF information may be combined into a single digital signal, e.g. by being incorporated in a single data packet for each package 50 visiting, or visited by, inspection station 40. Equally, the combined optical and RF data regarding a given package may be stored in a single record or related records of a relational database system, maintained locally or remotely. Uniquely, the inventive combination tag permits specific identification and optionally descriptive data regarding a merchandise item or other product to be correlated and associated with environmental condition exposure information specific to that package. Furthermore, the information can be obtained in a single pass by or with inspection station 40, if desired. Alternatively, or in addition, information may be read from visual indicator 30 by a human technician, operator, or other user, if desired, before, after or approximately at the same time as the RF data is obtained. Such human readability of the condition exposure information can be useful in many circumstances, e.g. for visual verification at point of use by end users such for example as medical technicians handling blood products.

Inspection station 40 can constitute a fixed position inspection station, to which a succession of packages 50 is brought, by hand, continuous run conveyor or by vehicle or other suitable means.

Alternatively, inspection station 40 may be portable, optionally being hand held, and being carried to the location or locations of package 50 and other packages bearing readable, interrogatable labels or tags such as RFID tag 10. The contents of such other packages may of course be similar to or quite different from the contents of package 50 as may be indicated by the RF data. Inspection station 40 may, if desired comprise separate portable, optionally hand-held, device embodiments of RF interrogator 42 and optical reader 44.

Many useful implementations of the methods and apparatus of the invention will be apparent to those skilled in the art, in light of the disclosure herein. For example, multiple packages 50 may comprise similar cases of a perishable comestible, such as fish, e.g. smoked salmon shipped from a smoking house in Scotland. Promptly after curing, batches of fish are labeled with combination RFID tags 10. Each tag 10 is provided with item identification in its memory 26, and may optionally have additional information regarding the contained salmon including, for example, the source of the fish, and the date of curing. The visual indicator 30 of each combination RFID tag 10 beneficially employs an active agent selected to provide a time-temperature indication corresponding with, or indicative of the freshness of the salmon. The selection can be made beforehand, in consultation with a vendor for the visual indicator. Thus, the visual indicator may be designed to have, for example, a threshold, being the development by active zone 32 of an appearance similar to that of reference zone 34. Any desired threshold may be selected, for example one providing an anticipated further 7 or 10 days of freshness before the product becomes unusable, unsafe or otherwise undesirable.

Figure 4:
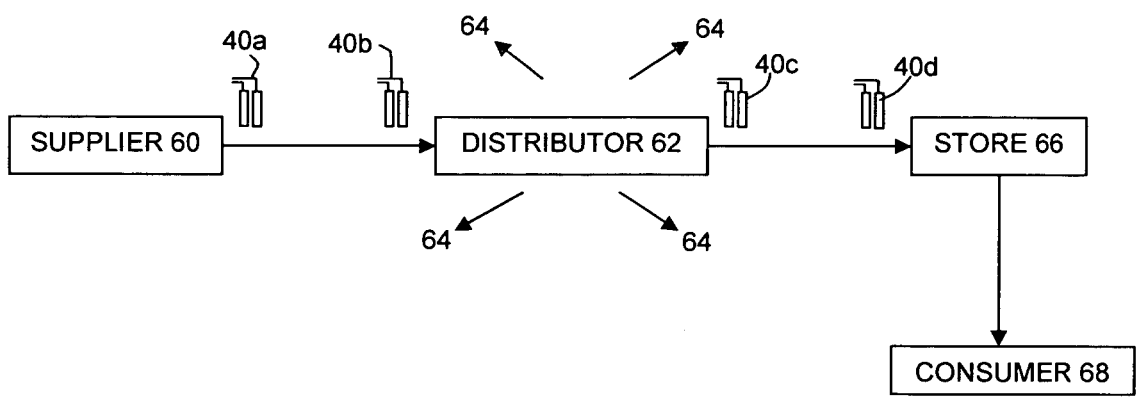
FIG. 4 is a schematic view of a utilization of the inventive products and methods in distributing commercial or other products from a supplier to consumers via a distributor and retailer.

Referring now to FIG. 4, the schematic diagram shown illustrates a relatively sophisticated implementation of the invention wherein the potential condition of perishable products can be monitored by taking densitometric readings at different points in the supply or distribution chain from supplier to consumer, or other end user of the perishable product. The distribution system and method illustrated employ a series of inspection stations 40*a*–40*d* positioned at strategic locations in the distribution chain, for example at locations where decisions can be made as to the disposition of a product accordingly to its sensed condition.

Shown are a supplier 60 who affixes a combination RFID tag 10 to a container (not shown), such as package 50, containing a perishable product. RFID tag 10 has digitally stored information and visual indicator parameters correlated with the contained product. The supplier can maintain a stock of suitable visual indicators 30, in cold storage, and assemble each visual indicator 30 with an RFID tag to provide combination RFID tag 10, at the time the respective container is made up. The visual indicator 30 will begin to monitor the temperature conditions to which the container is exposed. If desired, the combination RFID tag 10, complete with visual indicator 30 can be held in cold storage until needed, to prevent premature activation of the visual indicator active agent.

Supplier 60 employs inspection station 40*a* to monitor the condition of each specific inventory item labeled with a combination RFID tag 10, immediately prior to dispatch of the item from supplier 60's premises, to verify the freshness of the item. Station 40*a* reads the item ID and any available associated information via RF interrogation and reads the item's environmental exposure, e.g. to temperature, optically. Such monitoring can generate a detailed computer record which can be consulted in case of any question later regarding substandard products reaching the marketplace. The condition-enriched inventory history record is furthermore useful for quality control and other purposes, as will be apparent to those skilled in the art. Should a substandard item be identified by inspection station 40*a*, i.e. an item with a visual indication of an undesirable cumulative time-temperature exposure, the item can be processed in an appropriately different manner from acceptable items.

For example, one inventory item whose visual indicator 30 indicates that a freshness threshold has been reached may be discounted for a quick sale or may be diverted to a job lot broker or dealer who handles substandard merchandise, while a next similar item that has a different time-temperature history, has an indicator zone 32 appearance indicating that the freshness threshold has not yet been reached, is shipped to the intended customer.

Monitored items leave supplier 60 for a distributor 62 or other destination to which they are transported by truck, air, rail or other suitable means. In this exemplary embodiment, distributor 62 has a warehouse and employs inspection stations 40*b* and 40*c* at receiving and shipping locations, respectively, in the warehouse, to monitor tagged items as they enter and leave the warehouse. Inspection stations 40*b* and 40*c* can generate comparable data to that generated by station 40*a*. Undesirable differences between the respective readings of inspection stations 40*b* and 40*c* for a given item may indicate improper handling of that item in distributor 62's warehouse and can be acted on appropriately. For example a package or container may have been temporarily stored undesirably close to a warehouse furnace, or a couple of containers may be exposed to excess heat transmitted into the cargo area from a delivery truck's engine and transmission during summer traffic delays.

Sophisticated tracking systems employed pursuant to this invention can couple information received from visual and RF inspection of combination RFID tag 10, with knowledge of the routine handling procedures at each distribution step, e.g. the sequence of application of serial numbers and how that relates to normal truck loading procedures, to provide a comprehensive handling history of a given item, pinpointing its probable location in trucks, freight holds, warehouses and other containment areas during the distribution of the item and enable useful management determinations to be made as to the causes of condition exposure irregularities.

Substandard items detected by inspection station 40*b* at the warehouse receiving location can be returned to supplier 60, expedited to a point of sale and discounted, or otherwise handled in a different manner from satisfactory items.

Substandard items detected by inspection station 40*c* at the shipping location, where items leave the warehouse, can be handled in much the same manner as substandard items detected at inspection station 40*a* where items egress from supplier 60. It will be understood that a substandard determination may be based upon an undesirable cumulative environmental exposure indicated by visual indicator 32. Optionally, the active agent employed in indicator zone 32 of visual indicator 30 may have a time-condition response curve selected to allow for a differential between the experience of visual indicator 30 on combination RFID tag 10 secured to the exterior of package 50 or other container, and the probable exposure experienced by the contents of the package or container, protected as they are by the container walls and other packaging.

Goods or other items labeled with a combination RFID tag 10 are shipped out by distributor 62 to a number of destinations as indicated by arrows 64. One such destination is shown in FIG. 4 as being a store 66, which could, for example, be a local supermarket. Store 66 employs inspection station 40*d* to read the combination RFID tags of items received into the store from distributor 62. Substandard items detected at inspection station 40*d* can be processed in a manner similar to substandard items detected at inspection station 40*b* at distributor 60's receiving location. Consumers 68, or other customers, can make a visual check of active zone 3 of visual indicator 30*n* to determine the acceptability of the condition of an item received from store 66. For example, it may be that products having an active zone darker than reference zone 34, are regarded as unacceptable. If printed product identification information 29 is also provided, then the consumer can identify the specific item and its condition should they have any question to raise.

One suitable optical reader 44 comprises a reflection densitometer capable of reading the density, and the intensity, of the visual image provided by active zone 32. Densitometers such as are employed in the graphics arts industry to read the density of printed matter on a substrate, for example newsprint on newspaper, may be employed, as will be apparent to those skilled in the art and may be useful in some embodiments. Another useful embodiment of optical reader 44 comprises a device capable of reading the comparative reflectivities of at least two visually contrasting zones. Such a device may for example be a laser scanner or bar code wand, or a CCD-based image scanner. Other suitable reading devices will be apparent to those skilled in the art.

Optionally, optical reader 44 can be employed in conjunction with suitable software, to also read the visual intensity of reference zone 34. Local or remote software can then provide a comparative data point, indicative of the cumulative level of condition exposure, reporting that the chemically sensed condition has a magnitude about equal to, less than or greater than the threshold value indicated by the reference zone 34. Alternatively to an optical reading, a data value for the threshold may be provided in the computerized or other information system.

The distribution chain may have more or less links than are shown in FIG. 4, as will be understood by those skilled in the art. For example, supplier 60 may directly supply a store 66, or may supply a central location that distributes to a chain of stores 66, which central location then functions much like distributor 62. Alternatively, there may be two or more distributors 62 in the distribution chain. Or supplier 60 may ship directly to a consumer 68 or other end user. It will be apparent that most distribution configurations may, with advantage, comprise a field of application of the invention, and that one or more inspection stations 40 can be disposed at suitable points in the chain, as is described in connection with the embodiment shown in FIG. 4.

It will be understood that in the normal course of events significant time is consumed in the progress of an item from supplier 60 to consumer 66, or other and user, which time may comprise a few days, weeks, months or even years, depending upon the product. Accordingly, to provide adequate freshness of a perishable product to an end user, desirable freshness levels may be established as thresholds for different stages of the distribution chain which may each be expressed as a percentage of a threshold freshness, which may, for example, be an acceptable freshness for delivery to the consumer. Such stage thresholds may comprise system data points or could comprise subdivisions of reference zone 34 having various visual intensities indicative of various acceptable cumulative condition exposures at different points in the distribution chain. Optionally, a series of comparison colors indicating different degrees of exposure can be provided in any suitable graphic arrangement.

If desired data regarding the condition of each, or selected items distributed, at each inspection station 40, related to the established threshold for the stage of distribution at which the inspection station is located, may be centrally collected and collated to provide a comprehensive database describing the condition exposure history of each as selected, possibly statistically sampled, items distributed.

Acceptable standards of condition exposure at each of inspection stations 40*a*–40*d* can be established, if desired, with items not meeting the standard established for a particular station being rerouted, marked or otherwise differentially handled and preferably also being logged in a database as having substandard condition exposure at the particular distribution point where the respective inspection station 40*a*–40*d* is located. In one example of a protocol of acceptable exposure standards, an upper limit for temperature exposure of about 25% of threshold is set for inspection station 40*a*, at egress of the item from supplier 60; that for inspection station 40*b* at ingress to the distributor 62 may be 40% of threshold; that at station 40*c* at egress from distributor 64 may be 60% of threshold; and that at station 40*d*, at ingress to store 66 may be up to about 80% of the threshold value. Depending upon the particular protocol, the threshold value may be considered an acceptably limit for release to the consumer who may "manually", i.e. visually, read visual condition exposure indicator 30.

As can be understood from the foregoing description, the novel RFID tag and methods of the present invention provide an efficacious harnessing of information about the condition exposure history of a specific inventory item including product identification and related data, which information can include multiple time-displaced data points as well as an endpoint that can be used to trigger modified handling of the item. The information from multiple items can be compiled into a database that may be audited or statistically analyzed to reveal helpful information regarding the handling of the items and may be used to modify future handling, e.g. to avoid delays in handling or excessive storage periods or undesirable storage locations. Visual readability of the condition indicator and of the identification information, if such is printed on or near the tag, pursuant to an optional aspect of this invention, permits human verification of machine performance, human stand-in for a defective inspection station and human determination of the condition and identity of a given item when or where no inspection or reading devices are available.

Disclosures Incorporated. The entire disclosure of each and every United States patent and patent application, each foreign and international patent publication, of each other publication and of each unpublished patent application that is referenced in this specification or elsewhere in this patent application, is hereby incorporated herein, in its entirety, by the respective specific reference that has been made thereto.

While illustrative embodiments of the invention have been described above, it is, of course, understood that many and various modifications will be apparent to those of ordinary skill in the relevant art, or may become apparent as the art develops. Such modifications are contemplated as being within the spirit and scope of the invention or inventions disclosed in this specification.

The invention claimed is:

1. An RFID tag intended to be associated with a host product, the RFID tag comprising:
   a) a data memory to receive data regarding the host product;
   b) a transponder to transmit data in the data memory to an external RF interrogator in response to interrogation; and c) a nonelectric visually readable environmental-condition exposure indicator, the visual indicator being capable of sensing exposure of the RFID tag to an environmental condition experienced by the host product and of providing a visual indication readable externally of the RFID tag of the sensed environmental condition.

2. An RFID tag according to claim 1 wherein the visual indicator is attached to the RFID tag and the RFID tag is attached to or supported by the host product.

3. An RFID tag according to claim 2 disposed on the host product with a location and orientation to facilitate placement of the visual indicator in line-of-sight view with a visual inspector.

4. An RFID tag according to claim 1 wherein the environmental condition monitor can monitor the elapse of a predetermined integral of deleterious ambient conditions capable of correlating with the shelf life of such a product, the predetermined integral optionally an integral of temperature over time.

5. An RFID tag according to claim 4 wherein the indicator comprises a distinctively marked visible area on the RFID tag and optionally can provide an end point indication of impending shelf-life expiry or loss of freshness.

6. An RFID tag according to claim 4 wherein the elapse of the predetermined parameter is indicated by a change in color or pigment intensity of the indicator.

7. An RFID tag according to claim 6 wherein the visual change is effected by a chemically acting visually responsive agent optionally an acetylenic compound yielding a color change upon polymerization, the polymerization of the acetylenic compound being related to time-temperature exposure.

8. An RFID tag according to claim 6 comprising an ultraviolet protective layer overlying the indicator to protect the indicator from exposure to ambient ultraviolet light.

9. An RFID tag according to claim 1 wherein the visual indicator is embodied in a label attachable to or attached to the RFID.

10. An RFID tag according to claim 1 wherein comprising a printed circuit embodying the transponder and having an antenna to receive and transmit the RF signal and a decoder-processor to execute the RFID functions and provide analog-digital conversion.

11. An RFID tag according to claim 10 wherein the decoder-processor can retrieve stored data from the memory and modulate the RF signal output by the transponder to transmit the retrieved data to the interrogator.

12. An RFID tag according to claim 1 comprising printed or other human-readable indicia corresponding with the electronically stored information to permit optical reading of the identification data.

13. An RFID tag according to claim 1 in combination with a perishable product wherein the RFID tag is attached to the perishable product.

14. A combination according to claim 13 wherein the perishable product is packaged and the RFID tag is disposed on the package so that the condition indicator is visible externally of the package and the RFID is readable by a remote interrogator.

15. An RFID tag according to claim 1 in combination with an indicator-reading device capable of reading the visual indicator.

16. An RFID tag combination according to claim 15 further comprising an RF interrogation device capable of reading information from the RFID-tag.

17. An RFID tag combination according to claim 16 wherein the indicator-reading device is cooperatively associated with the RFID interrogation device to obtain readings of both the visual indicator and data regarding the host product in one pass at a single station and, optionally, wherein the visually read and RF information are combined into a common signal or database.

18. A method of obtaining identification and environmental condition exposure information from a host product comprising associating a condition-sensing RFID tag according to claim 1 with the host product throughout a period of exposure of the host product to an environmental condition, the method comprising obtaining identification information from the data memory by RF interrogation of the transponder, optically reading condition exposure information from the visual indicator and, optionally, human reading of information displayed on the RFID tag.

19. A method according to claim 18 comprising cooperatively associating, at an inspection station, an RFID interrogation device to effect the RF interrogation with an optical reading device to read the visual indicator, and obtaining the identification and condition exposure information in a single pass of the inspection station.

20. A method according to claim 19 comprising feeding separate visual reading and RF interrogation signals to a single data processor, integrating the information, and outputting data from the data processor as to the condition of a specific, uniquely identified product, the method optionally being repeated for multiple items.

21. A method according to claim 19 wherein a supplier of the host product employs the inspection station to effect said sensing of the condition of each of multiple specific inventory items of the host product, each inventory item being provided with one of the combination RFID tags prior to dispatch of the item from the supplier 60's premises, to verify the freshness of the item and optionally to generate a computer record comprising a condition-descriptive inventory history record of the multiple inventory items with identification of each.

22. A method according to claim 19 wherein a substandard item identified by the inspection station, being an item having a visual indication of an undesirable cumulative time-temperature exposure, is processed in an appropriately different manner from acceptable items, optionally by discounting an inventory item having a visual indicator indicating that a freshness threshold has been reached or diverting such undesirably exposed item to a job lot broker or dealer who handles substandard merchandise.

23. A method according to claim 21 wherein monitored items are transported from the supplier to a distributor having at least one inspection station to monitor RFID tagged inventory items when the inventory items are received by the distributor or leave the distributor or at both the times of receipt and of dispatch, the at least one inspection station optionally generating a computer record comprising a condition-descriptive inventory history record of the multiple inventory items with identification of each.

24. A method according to claim 23 wherein substandard items detected by the at least one distributor inspection station are returned to the supplier or are expedited to a point of sale and discounted or are otherwise handled in a different manner from satisfactory items.

25. A method according to claim 18 comprising employing a tracking system to couple information received from visual and RF inspection of combination RFID tag 10, with knowledge of the routine handling procedures at one or more steps in the distribution of inventory items of the host product to provide a handling history of a given item to identify undesired condition exposure and indicate the location of the item during such undesired condition exposure.

26. A method according to claim 23 wherein inventory items labeled with a combination RFID tag distributed to a store wherein the store employs an inspection station to read the combination RFID tags associated with host product items received into the store from the supplier, optionally via a distributor, and wherein items detected as substandard items are treated differentially with respect to items detected as meeting standard.

27. A method according to claim 26 wherein store customers, make a visual check of the visual indicator of a combination RFID tag associated with a host product item purchased or considered for purchase by the customer to determine the acceptability of the condition of an item received from store 66 and wherein the store customers accept or reject the item accordingly.

28. A method according to claim 18 wherein desirable freshness levels are established as thresholds for different stages of a host product distribution chain including at least a supplier, a store and customers of the store and optionally also including a distributor which may each be expressed as a percentage of a threshold freshness, and wherein such stage thresholds comprise system data points or subdivisions of a visual indicator reference zone, or both the data points and the subdivisions, the data points corresponding with and the subdivisions having different visual intensities indicative of different acceptable cumulative condition exposures at different points in the distribution chain.

29. A method according to claim 28 including inspecting a host product item at multiple points in the distribution chain, performing an RF interrogation and visual read of the combination RFID tag associated with each product item at each of the multiple points, and centrally collecting data from the inspections to provide a comprehensive database describing the condition exposure history of each product item.

* * * * *